United States Patent [19]

Tanis

[11] Patent Number: 5,413,531
[45] Date of Patent: May 9, 1995

[54] ROTOR ASSEMBLY FOR A COMBINE

[75] Inventor: Dale R. Tanis, Naperville, Ill.

[73] Assignee: Case Corporation, Racine, Wis.

[21] Appl. No.: 103,070

[22] Filed: Aug. 6, 1993

[51] Int. Cl.⁶ .............................................. A01F 12/18
[52] U.S. Cl. ........................................ 460/72; 460/122
[58] Field of Search ................ 460/67, 71, 72, 121, 460/122

[56] References Cited

U.S. PATENT DOCUMENTS

| | | | |
|---|---|---|---|
| 3,07,924 | 3/1963 | Dietrich | 130/27 |
| 671,325 | 4/1901 | Rinck | 460/121 |
| 1,571,128 | 1/1926 | Lucas . | |
| 2,349,380 | 5/1944 | Rietz | 130/27 |
| 2,361,633 | 10/1944 | Jones | 130/27 |
| 3,664,100 | 5/1972 | Rowland-Hill | 56/14.6 |
| 4,178,943 | 12/1979 | West | 130/27 |
| 4,884,994 | 12/1989 | Hall et al. | 460/122 X |
| 4,889,517 | 12/1989 | Strong et al. | 460/66 |
| 5,035,675 | 7/1991 | Dunn et al. | 460/62 |
| 5,192,245 | 3/1993 | Francis et al. | 460/71 |

Primary Examiner—Terry Lee Melius
Attorney, Agent, or Firm—Rudnick & Wolfe

[57] ABSTRACT

A threshing rotor for an agricultural combine. The threshing rotor comprises an elongated drum having a generally cylindrical outer wall defining a smooth outer surface or skin extending along the length of the drum and having a plurality of straps or bands circumferentially arranged about and disposed along the outer wall of the rotor. Each band or strap has at least one threshing element connected thereto. A clamp mechanism releasably secures each strap against the outer wall of the drum and permits the strap and the threshing element connected thereto to be quickly replaced and/or shifted relative to adjacent threshing elements carried by adjacent straps. The threshing rotor further includes stops provided on opposite sides of each strap to inhibit longitudinal shifting of the strap along the outer wall of the rotor during a threshing operation.

19 Claims, 4 Drawing Sheets

ROTOR ASSEMBLY FOR A COMBINE

FIELD OF THE INVENTION

The present invention generally relates to agricultural threshing machines such as combines and, more particularly, to a rotor assembly for a combine.

BACKGROUND OF THE INVENTION

A conventional agricultural combine includes a header assembly for severing and collecting crop materials as the combine is driven through a field and a feeder mechanism for advancing and elevating the crop materials to a threshing area on the combine. In the threshing area of the combine, the crop materials are threshed by a rotor assembly to separate grain from material other than grain.

A typical rotor assembly includes an elongated cylindrical member or rotor having a series of threshing elements peripherally arranged thereabout. The threshing elements outer surface is arranged proximate to and cooperate with a cylindrical casing which surrounds the rotor. The rotor is mounted on a frame of the combine and is rotatably driven at variable speeds depending on the crop material being harvested. As the rotor rotates, the threshing elements impact with the crop materials and thereby separate grain from material other than grain.

It is customary to use different rotors for harvesting different crop materials. For example, certain threshing elements having predetermined configurations will be peripherally arranged about the circumference of the rotor in a particular or preset manner when the combine is to be used to harvest small grain, corn and soybeans. On the other hand, certain other threshing elements having predetermined configurations and which are otherwise arranged about the rotor are used when the combine is used to harvest rice, edible beans and damp, weedy crops. As will be appreciated by those skilled in the art, use of a particular rotor configuration, which may be mismatched to the particular crop being harvested, can result in both inefficient waste of the primary crop, frequent jamming of the rotor, and downtime for the entire combine.

Combines are, of course, rather massive and relatively expensive pieces of agricultural equipment. Although the rotor is a relatively expensive component of the combine, some users find it advantageous to have numerous rotors on hand thereby enhancing versatility of the combine by changing the rotor for different crops. The rotor of a combine, however, is quite heavy and unwieldy, weighing far in excess of what is manually liftable even by several persons. Thus, and assuming that a number of different rotors are at hand, changing of one rotor for another in a given combine is a difficult operation, requiting the use of auxiliary lifting devices. Frequently, the practical effect of this situation is to severely limit the harvesting applications for which a combine can be used.

Some rotors are designed with a plurality of mounting lugs secured about an outer cylindrical wall of the rotor. Typically, these lugs are welded to the outer wall of the rotor to provide an array of helical rows, circumferential rows, and longitudinal rows over the entire surface of the rotor drum or wall. Threshing elements are releasably secured to the mounting lugs in predetermined order to accomplish the desired threshing effect for a particular rotor. The threshing elements are commonly secured to the mounting lugs as with a releasable fastener assembly which passes through apertures in the threshing element.

In accordance with that discussed above and depending upon the particular threshing action required, different types of threshing elements may be secured to the various arrays of mounting lugs extending along and about the outer wall of the rotor. Moreover, and depending upon the particular threshing action desired, the threshing elements are releasably secured to the mounting lugs to provide different arrays extending about and along the length of the rotor.

In some forms, the threshing elements have an elongated or helical configuration. As such, one end of the threshing element is secured to one mounting lug while the other end of the threshing element is secured to another mounting lug. The spacing an arrangement of the mounting lugs about and along the rotor, of course, must correspond to the spacing of the apertures in the threshing elements to allow for interchangability of the threshing elements.

As the combine passes over the field, stones, rocks and other hard debris may often be picked up from the field. Notwithstanding the operator's carefulness and-/or rock traps provided in the feeder assembly, these stones and rocks occasionally pass into the threshing area of the combine. As the rotor operates, these rocks and other hard debris impact with the threshing elements and mounting lugs. The impact forces against the threshing elements can affect the fastener assembly holding the thresher element to the mounting lug and can furthermore cause denting and severe harm to the mounting lugs and the outer cylindrical wall of the rotor. Denting of the threshing rotor may likewise effect the threshing action of the threshing elements connected to the displaced mounting lug. That is, denting of the rotor and/or mounting lugs will likely alter the position of the threshing elements relative to the inner surface of the casing thus effecting the efficiency of the rotor assembly. Moreover, harm to the mounting lugs can increase the difficulty and thus time required to fasten a threshing element thereto.

Besides denting of the rotor, the unused mounting lugs arranged about the periphery of the rotor provide a multitude of edges which impact against the crop materials as the materials pass through the threshing assembly—naturally resulting in some level of abrasive action which typically damages the crop material. As used herein, the term "damage" is meant to include splitting, cracking, nicking, scratching and/or marring of the harvested crop materials. As will be appreciated, damaged crop materials is an inferior grade of product which quickly spoils and, therefore, only a relatively small percentage is permitted by volume in those products intended for human consumption. Because only a relatively small percentage of damaged material is permitted in those products intended for human consumption such as corn, soybeans, kidney beans, peas and others, farmers are paid a premium price for crop materials having a relatively low damage content by volume at a collection station.

Thus, there is a need and a desire for a combine having a rotor which can be readily converted for a wide variety of harvesting applications as required without having to remove the rotor from the combine and while providing a minimal number of edges which can impact against the crop materials thereby limiting damage to the crop materials as they are threshed in the threshing area.

SUMMARY OF THE INVENTION

In view of the above, and in accordance with the present invention, there is provided a threshing rotor for a combine. The threshing rotor of the present invention is readily convertible for use with any crop material to overcome the problems described above. The convertibility of the threshing rotor of the present invention is readily achieved without requiring removal of the rotor from the combine.

The threshing rotor of the present invention is mounted for rotation within and is operable in conjunction with a cylindrical casing mounted on the frame of the combine. The rotor comprises an elongated drum having a generally cylindrical outer wall defining a smooth outer surface or skin extending along the length of the drum. In order to provide total latitude as to the configuration and orientation of the threshing elements to be disposed on the rotor, the outer surface of the rotor has none of the permanently affixed helical and/or straight rasp bars which were heretofore conventional. Nor does the rotor of the present invention have a plurality of mounting lugs which project radially outward from the outer wall of the rotor. Instead, the rotor is provided with a plurality of straps or bands circumferentially arranged about and disposed along the outer wall of the rotor. Each band or strap has at least one threshing element connected thereto. A clamp mechanism releasably clamps each strap against the outer wall of the drum and permits the strap and the thresher element connected thereto to be quickly replaced, and/or shifted relative to adjacent threshing elements carded by adjacent straps. Thus, the threshing elements can be spaced relative to each other about the circumference of the drum in any army of patterns including helical rows, longitudinal rows, and circumferential rows over the entire surface of the drum.

In one embodiment of the invention, each band or strap is comprised of a plurality of individual strap elements circumferentially arranged in a common plane about the rotor drum. Each strap element includes inner and outer generally parallel major surfaces with apertured and upturned extensions being provided at opposite ends of each element. The apertures in the upturned extensions accommodate and allow for passage of a clamp fastener therethrough.

Some thresher elements are adapted to be connected to a single band or strap. Other threshing elements may have an elongated configuration and are connected to two or more bands or straps. The threshing elements may be formed with a variety of outer working surfaces. In one embodiment, the threshing element includes opposite side walls which are joined to each other by a front wall. To add strength and rigidity to the threshing element design, at least one of the side walls is preferably connected to the upturned extension on the strap and extends forwardly, in the direction of rotor rotation, from the upturned extension. Moreover, a top portion of the front wall is disposed a further distance from the strap than is a top surface of the apertured extension. By this construction, the front wall of the threshing element deflects crop materials outwardly and away from the clamp fastener forming part of the clamping mechanism thereby prolonging its useful life expectancy.

The threshing rotor preferably includes stops provided on opposite sides of each strap to inhibit longitudinal shifting of the strap along the outer wall of the rotor during a threshing operation. In a most preferred form of the invention, clips are carded about and fixed to the outer wall of the rotor in longitudinally spaced relation to each other. The clips slidably and releasably accommodate the straps therebetween in a manner inhibiting longitudinal shifting of the straps along the outer wall of the rotor.

The threshing elements connected to the individual straps may be either adjusted or replaced as required depending upon particular crop conditions thereby enhancing the versatility of the combine although a single non-replaceable rotor is used for threshing. That is, the straps may be circumferentially adjusted such that the threshing elements thereon can be arranged in substantially any desired pattern of threshing to suit the particular crop and harvesting conditions which are encountered. Moreover, the strap segments arranged intermediate the threshing elements on a strap provide an additional layer of protection to the outer wall or skin of the drum. The straps may be positioned to either overlie dented portions of the drum thus maintaining a proper spacing between the thresher elements and the interior of the casing while protecting the drum against further damage frown rocks and the like which are encountered during combine operation. Moreover, replacement of the straps permits different threshing elements to be arranged on the circumference of the rotor as required by a particular crop condition. During the threshing operation the clamp fastener is protected against damage by the configuration of the threshing elements. Moreover, because a smooth outer surface (rather than unused mounting lugs projecting into the annular space between the rotor and casing) is provided along the circumference of the drum, with the straps being clamped thereto, less crop material damage is likely to result during the threshing process.

Numerous other features and advantages of the present invention will become readily apparent from the following detailed description, the accompanying drawings and the appended claims.

DETAILED DESCRIPTION OF A PREFERRED EMBODIMENT

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 1:
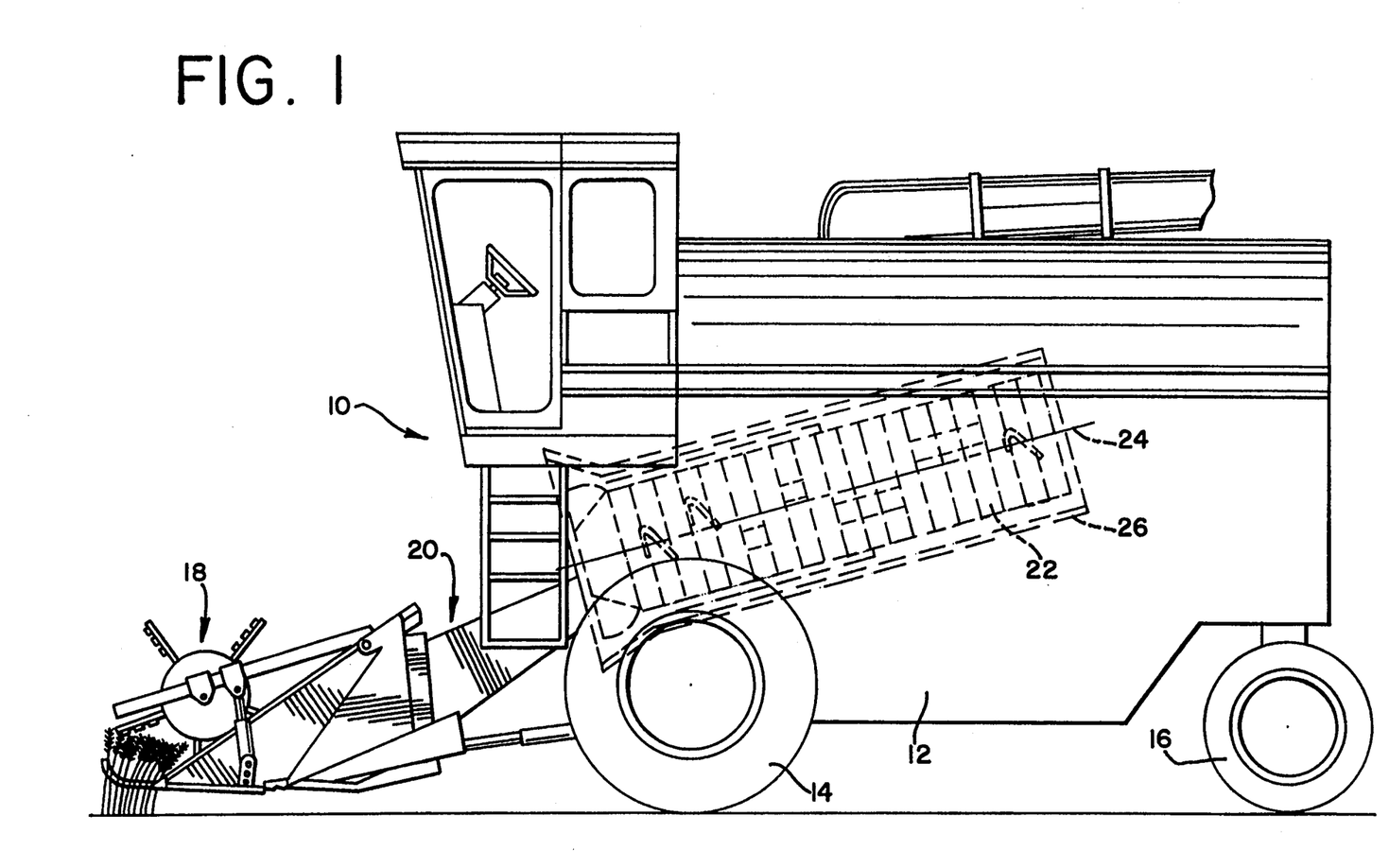
FIG. 1 is a diagrammatic side view of one form of combine to which the rotor assembly of the present invention is applicable.

Referring now to the drawings, wherein like reference numerals indicate like parts throughout the several views, there is shown a self-propelled combine 10 with a fore-and-aft extending frame 12 supported for movement over a field by front and rear pairs of wheels 14 and 16, respectively. At a forward end combine 10 has a conventional header assembly 18 for severing and gathering crop materials, and a suitable feeder mechanism 20 for elevating and rearwardly advancing the crop materials toward a threshing area on the combine.

A rotary combine such as a Model No. 1600 combine sold by the Assignee listed hereon is schematically illustrated in the drawings. It should be appreciated, however, that the teachings of the present invention are equally applicable to other types of combines having a threshing area wherein grain is separated frown material other than grain.

The threshing area of a combine is defined by a rotor assembly preferably comprised of a driven rotor 22 mounted for rotation about an elongated axis 24 within a stationary apertured cylindrical housing or casing 26 mounted on the frame 12. Casing 26 is provided with a conventional "concave and grate" configuration.

Figure 2:
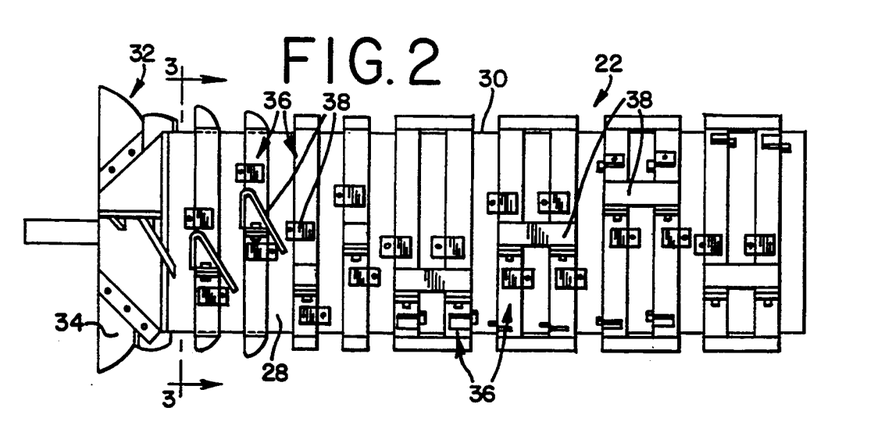
FIG. 2 is a side view of a rotor according to the present invention.

Turning to FIG. 2, the combine rotor 22 preferably includes an elongated drum 28 having a generally cylindrical outer wall 30 extending along the length thereof. Notably, wall 30 has a relatively smooth outer surface extending between opposite ends of the drum 28. In the illustrated embodiment, an impeller assembly 32 having a plurality of impeller blades 34 is provided at a forward end of the rotor.

Figure 3:
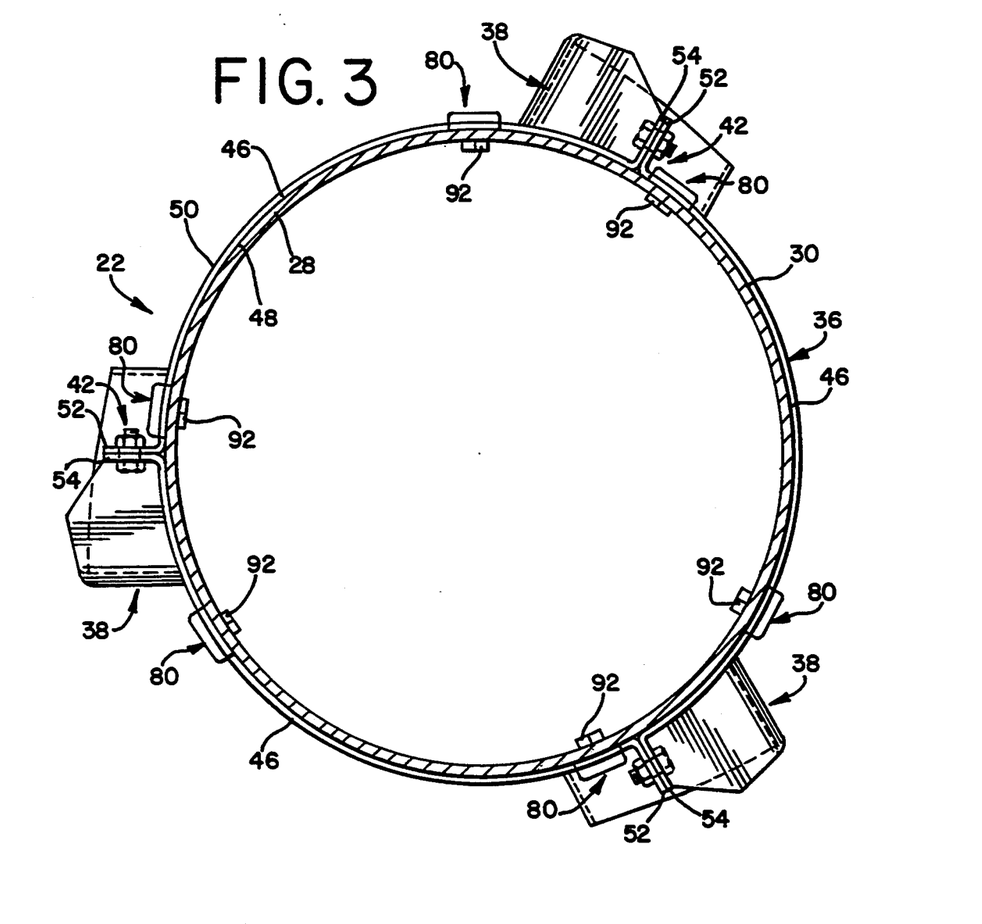
FIG. 3 is a sectional view taken along line 3—3 of FIG. 2.

Rotor 22 further includes a plurality of individual straps 36 circumferentially arranged about and longitudinally spaced along the outer wall 30 of the rotor 22 for rotation therewith. Each strap 36 has at least one threshing element 38 connected thereto. As shown in FIG. 3, three threshing elements are preferably connected to each band or strap 36. Each strap 36 is releasably mounted about the rotor 22 by a clamping mechanism 42.

The threshing elements 38 carried by straps 36 are adapted to cooperate with casing 26 (FIG. 1) in threshing crop material harvested by the combine. In the preferred form of the invention, the inner surface of casing 26 and the outer wall 30 of rotor 22 define a generally annular space therebetween and through which crop materials circulates and advances rearwardly toward an outlet of the combine.

Each strap is substantially similar in construction. Thus, only a single strap or band 36 will be described in detail with the understanding that adjacent straps are similarly constructed. In the illustrated embodiment each strap 36 is held in tension about the rotor 22. It is within the spirit and scope of the present invention to fabricate each strap or band 36 from a single element having split ends allowing the strap or band to be releasably clamped against the outer wall 30 of the rotor 22. To facilitate balancing of the rotor, however, each strap is preferably fabricated from a plurality of strap elements. When two strap elements are utilized, the distance separating opposite ends of each strap element approximates about a 180° peripheral and cross-sectional segment of the rotor to which the strap element is adapted to be attached. Of course, if four strap elements are utilized, the distance separating opposite ends of a particular strap element will approximate about a 90° peripheral and cross-sectional segment of the rotor to which the strap element is adapted to be attached.

Figure 4:
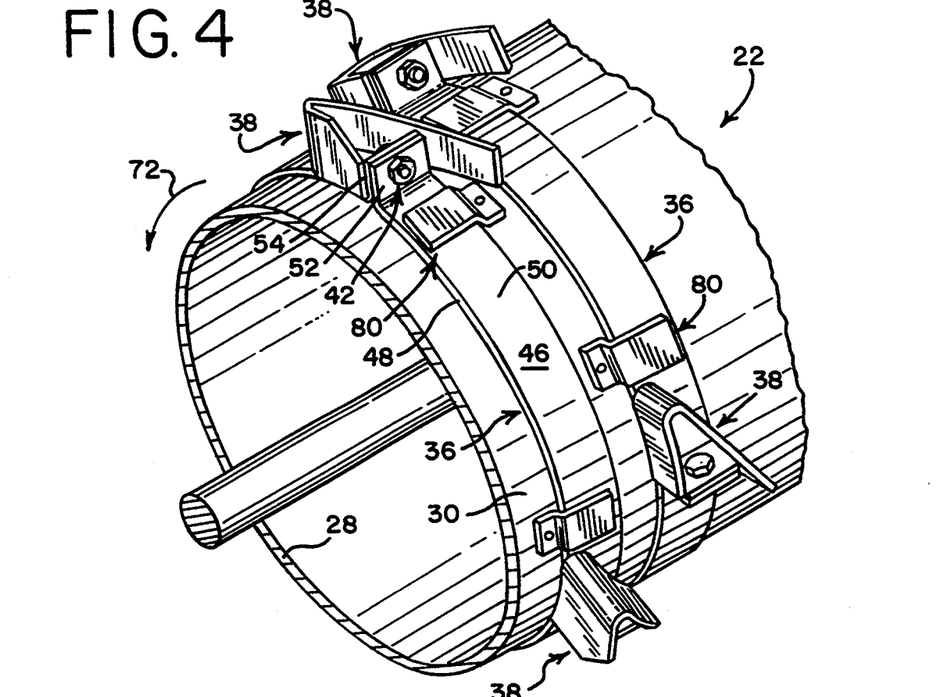
FIG. 4 is a perspective view of a portion of the rotor of the present invention.

In a preferred form, each strap 36 is comprised of three interconnected strap elements 46 circumferentially arranged in a common plane about the rotor. Each strap element 46 is semi-rigid in construction and includes inner and outer generally parallel major surfaces 48 and 50, respectively, with first and second ends. As shown in FIGS. 3 and 4, each strap element 46 has a generally curved configuration intermediate the ends thereof. The curved configuration of each strap element proximates the profile of the rotor to which it is to be releasably clamped.

Each strap element 46 preferably includes upturned and apertured extensions 52 and 54 at opposite ends thereof. Each extension 52, 54 projects outwardly and away from the outer surface 50 of a respective strap element 46 and, in the preferred embodiment, forms part of the clamping mechanism 42.

Figure 5:
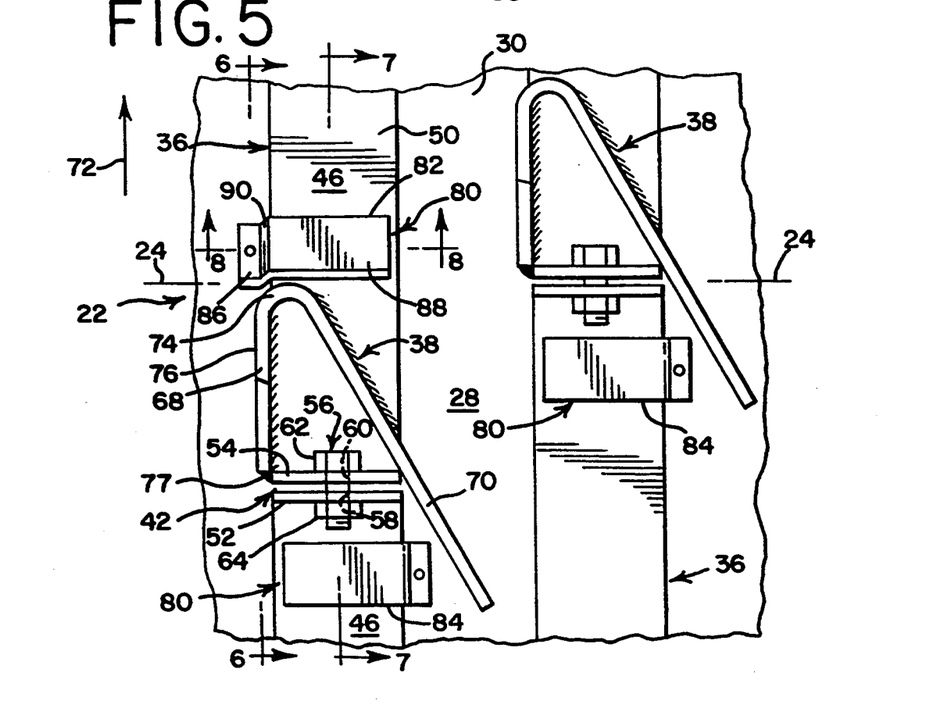
FIG. 5 is an enlarged fragmentary plan view of straps which are releasably secured about the circumference of the rotor.

As shown in FIG. 5 the upturned extension 52 of one strap element 46 is releasably interconnected to the upturned extension 54 of another strap element of the same strap or band 36 by a clamp fastener 56 which is accommodated within and passes through aligned apertures 58 and 60 defined by the extensions 52 and 54, respectively. In the illustrated embodiment, clamp fastener 56 includes an elongated threaded bolt 62 and nut 64 combination.

As mentioned above, three threshing elements 38 are preferably connected to each band or strap 36. With the preferred embodiment, a threshing element 38 is connected to each band or strap 36 proximate to the interconnection of each of the strap elements 46 for that respective band or strap 36.

As will be appreciated, the threshing elements selectively connected to each strap 36 can take a variety of shapes and sizes. The threshing elements can be configured to provide the desired degree of threshing action and may be sized for connection to a single strap 36. Alternatively, elongated threshing elements or rasp bars can be individually connected to and span the longitudinal distance between two bands or straps 36. The ability to independently adjust the bands 36 about and along the drum 28 readily allows helically shaped threshing elements to be secured to the rotor 22.

A series of paddle-like threshing elements are schematically illustrated in the drawings as being connected to a single band or strap 36. Since the illustrated threshing elements 38 are substantially identical, only one threshing element will be discussed in detail with the understanding that the other threshing elements are substantially similar in construction.

In the illustrated embodiment, threshing element 38 includes first and second side walls 68 and 70, respectively, which angularly diverge relative to each other and are joined at a forward end (in the direction of rotor rotation indicated by arrow 72) by a front wall 74. In the illustrated embodiment, side wall 70 is angularly offset relative to the axis of rotation 24 of the rotor 22 to promote rearward movement or advancement of the crop materials through the threshing area. The side walls 68, 70 and front wall 74 each extend away from the outer surface 50 of the strap elements 46 forming the strap and combine to define a smooth outer material engaging surface 76 for the threshing element. As best illustrated in FIG. 5, the illustrated configuration of the threshing element 38 provides easy access to the clamp fastener 56 when the strap or band 36 requires adjustment or replacement.

Figure 6:
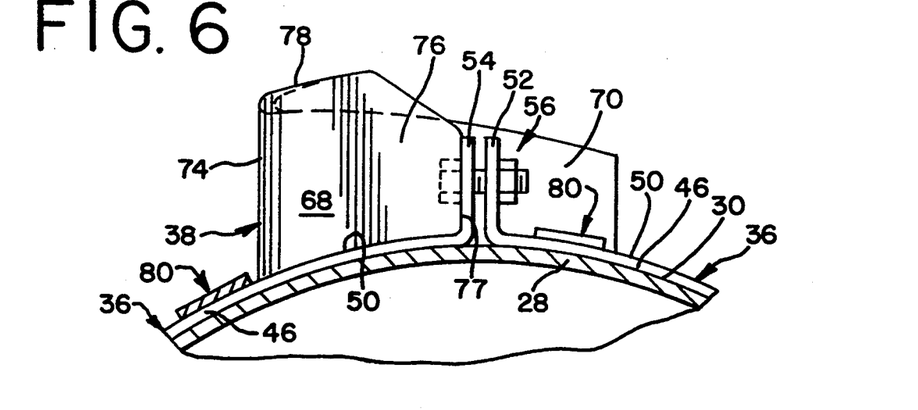
FIG. 6 is a fragmentary sectional view taken along line 6—6 of FIG. 5.

In a preferred form of the invention, each threshing element 38 is connected to a strap element 46 in a manner adding strength and rigidity to the strap and thresher element combination. As shown in FIGS. 5 and 6, a rearmost edge 77 of the side wall 68 of threshing element 38 is affixed, as by welding, to the upturned extension 54 of strap element 46. As shown, the side wall 68 of the threshing element extends forwardly in the direction of rotor rotation from its connection to the extension 54 and along with the front wall 74 is affixed as by welding to the strap element 46 thereby adding strength and rigidity to the threshing element and strap combination.

Figure 7:
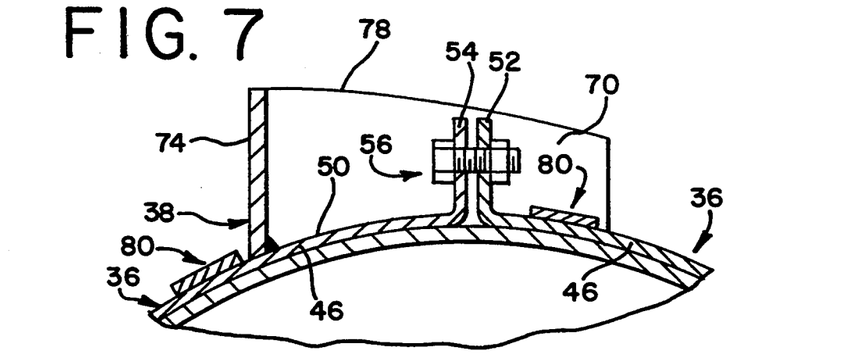
FIG. 7 is a fragmentary sectional view taken along line 7—7 of FIG. 5.

Turning to FIGS. 6 and 7, each threshing element 38 has a top portion or surface 78 defined by the side walls 68, 70 and front wall 74. The top portion or surface 78 of each threshing element is disposed a predetermined distance away from the outer surface 50 of the strap element 46. Notably, the top portion or surface 78 is disposed a greater radial distance from the outer surface 50 of the strap element 46 than is the clamp fastener 56. Accordingly, during a threshing operation, the configuration of the threshing element deflects crop materials being threshed in the threshing area outwardly and away from the clamp fastener thereby prolonging the useful life expectancy of the clamp fastener 56.

Figure 8:
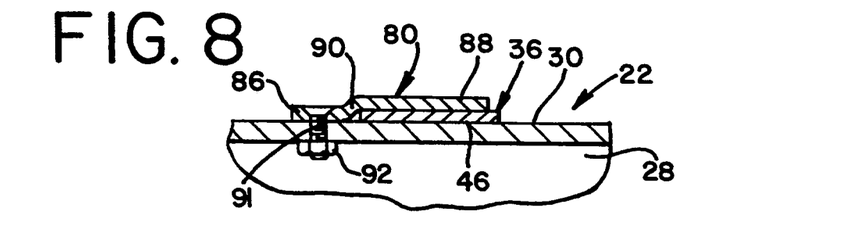
FIG. 8 is an enlarged sectional view taken along line 8—8 of FIG. 5.

As schematically illustrated in FIGS. 5 and 8, the rotor 22 is preferably provided with stops 80 provided on opposite sides of each strap 36 for inhibiting longitudinal shifting of the straps 36 along the smooth outer wall 30 of the rotor 22. In a preferred form of the invention, each stop 80 includes a pair of spring clips 82 and 84 preferably associated with each element comprising the band or strap 36. In a most preferred form of the invention, each clip is disposed toward opposite ends of each strap element 46 comprising a band or strap 36.

Each clip 82, 84 is fabricated from a suitable spring steel capable of withstanding the threshing area environment and preferably has a cantilevered configuration. As shown in FIG. 8, each spring clip includes first and second end portions 86 and 88, respectively, which are joined to each other by a midsection 90. The first end portion 86 of each clip is affixed to the outer surface 30 of the drum 28 as with a suitable threaded fastener 91. If desired, a suitable nut 92 is provided on an interior surface of the drum 28 to cooperate with the fastener 91 in attaching a clip to the outer wall of the rotor. The other end portion 88 of the each clip is spaced from the smooth outer surface 30 of the drum 28 as by a suitable fold or bend in the midsection 90. The spacing of the second end portion 88 from surface 30 of drum 28 allows a strap element 46 to be releasably and snuggly accommodated thereunder. As will be appreciated, the clips 82, 84 are affixed to the rotor 22 such that one of the clips inhibits longitudinal movements of a respective strap in a first longitudinal direction while the other clip inhibits longitudinal movements of the strap in the opposite longitudinal direction.

It will be appreciated from the foregoing that the threshing element 38 on any particular strap 36 may be readily arranged relative to adjacent threshing elements both longitudinally and circumferentially. Thus, an almost limitless variety of threshing element patterns, as desired or required, may be readily provided on the rotor 22 for accomplishing the most efficient threshing operation. Accordingly, if crop conditions change or if combine is to be used to harvest different crops in different fields, the rotor 22 can be readily adjusted to accommodate such changes in a minimal period of time. Providing straps 36 for securing the threshing elements 38 to the rotor 22 yields notable advantages in that the straps pass over dented or otherwise disfigured portions of the outer wall of the rotor 22 thereby maintaining the threshing elements 38 in relatively constant relation with the interior surface of the casing 26 thus enhancing the efficiency of the combine. Also, the straps 36 add an additional layer of protection thereby inhibiting damage to the outer wall of the rotor 22. Moreover, the straps 36 provide a smooth outer surface between the threshing elements 38 thereby reducing crop material damage during the threshing operation.

It should be understood that other shapes and forms of threshing elements other than that shown and described above may be utilized with one or more of the straps 36. It being understood that longitudinally elongated threshing elements may be connected between two straps. The ability to both longitudinally and circumferentially adjust the straps 36 promotes fastening different threshing elements to the rotor without valuable time being lost to align the threshing element fasteners with suitable apertures in non-adjustable mounting lugs affixed to the drum 28 of the rotor 22.

The design of the illustrated threshing elements offers significant advantages during the threshing operation. The smooth outer material engaging surface 76 extending about the threshing element 38 reduces damage to the crop materials being threshed. In the illustrated embodiment, the diverging angle of the side wall 70 promotes advancement of crop materials through the rotor 22. Designing the threshing element 38 in the illustrated manner facilitates access to the clamp fastener 56. Furthermore, having the top portion or surface 78 of the threshing element disposed a further distance from the outer surface of the drum 28 than is the clamp fastener 56, promotes deflection of crop materials away from and conceals the fastener 56 during a threshing operation thereby inhibiting damage to crop materials while prolonging the life expectancy of the fastener 56.

From the ongoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A combine having a mobile frame and a threshing assembly mounted on the frame, said threshing assembly comprising:

a stationary generally cylindrical casing mounted on the frame; and a rotor coaxially mounted for rotation and operable in conjunction with the cylindrical casing to thresh and separate grain from material other than grain, said rotor comprising an elongated drum having a generally cylindrical outer wall extending along the length of the drum, and a plurality of longitudinally spaced straps circumferentially arranged along and about the outer wall of the drum, each strap having at least one threshing element connected thereto, and a clamp mechanism for releasably clamping the strap against the outer wall of the drum, said clamping mechanism permitting the respective strap and the threshing element connected thereto to be quickly and easily replaced and/or shifted relative to adjacent threshing elements carried by adjacent straps thus enabling the same rotor to handle different crop materials depending upon the circumferential orientation and longitudinal spacing of the straps relative to each other about and along the rotor.

2. The combine according to claim 1 wherein said rotor further includes stops provided on opposite sides of each strap to inhibit longitudinal shifting of the strap along the outer wall of the rotor.

3. The combine according to claim 1 wherein said rotor further includes clips carded about and fixed to the outer wall of the rotor in longitudinally spaced relation relative to each other for slidably and releasably accommodating the straps therebetween in a manner inhibiting longitudinal shifting of the straps along the outer wall of the rotor.

4. The combine according to claim I wherein each strap defines inner and outer generally parallel surfaces and upturned extensions at opposite ends of each strap, and wherein each extension forms a portion of the clamping mechanism and defines an aperture therein for accommodating passage of a clamp fastener therethrough.

5. The combine according to claim 4 wherein the threshing element connected to each strap includes a first side wall which extends generally normal to the strap and extends forwardly from said apertured extension in the direction of rotor rotation.

6. The combine according to claim 5 wherein one form of thresher element includes a second side wall which is joined to the first side wall by a front wall, a top portion of the front wall being disposed a further distance from the strap than is a top portion of said apertured extension.

7. The combine according to claim 6 wherein at least one side wall of said thresher element is joined to one of said upturned extensions on said strap to add strength and rigidity to the thresher element and strap combination.

8. A threshing rotor for a combine said rotor comprising:
   an elongated drum adapted for rotation about a fixed axis and having a generally cylindrical outer wall extending between longitudinally spaced ends of the drum; and
   a plurality of straps circumferentially arranged about said outer wall of the drum between said ends, each strap having at least one threshing element connected thereto and a clamping mechanism for releasably clamping the strap against the outer wall of the drum, said clamping mechanism permitting said strap and the threshing element connected thereto to be quickly and easily replaced and/or shifted relative to adjacent thresher elements carried by adjacent straps thus enabling a common rotor to be used in threshing different types of crop materials depending on the circumferential orientation and longitudinal spacing of the straps about and along the rotor.

9. The threshing rotor according to claim 8 further including stops for inhibiting said straps from shifting along the drum.

10. The threshing rotor according to claim 8 further including a series of clips provided circumferentially about the outer wall of the elongated rotor drum for preventing longitudinal shifting of the straps relative to the drum.

11. A threshing component adapted for attachment to a combine rotor, said threshing component comprising:
    a semi-rigid strap having inner and outer generally parallel major surfaces with first and second ends and a generally curved configuration intermediate the ends thereof, said strap further including apertured and upturned extensions provided toward opposite ends thereof to project outwardly from the outer major surface, with the curved configuration of each strap being complementary to a curved configuration provided about a periphery of the rotor to which the member is to be attached; and
    a threshing element connected proximate to one of said upturned and apertured extensions on said strap, and with said threshing element being connected to said extension and along a lengthwise portion of the strap to add strength and rigidity to the threshing component.

12. The threshing component according to claim 11 wherein said threshing element includes a pair of side walls which extend from the extension on the threshing element and are joined by a front wall, with a top surface portion of the front wall of the threshing element being disposed a greater distance from the outer surface of the strap than is the aperture defined by the upturned extension.

13. A combine having a mobile frame and a threshing assembly mounted on the frame said threshing assembly comprising:
    a stationary generally cylindrical casing mounted on the frame; and
    a rotor coaxially mounted for rotation and operable in conjunction with the cylindrical casing to thresh and separate grain from material other than grain, said rotor comprising an elongated drum having a generally cylindrical outer wall extending along the length of the dram, and a plurality of longitudinally spaced straps circumferentially arranged along and about the outer wall of the drum, each strap having one or more threshing elements connected thereto, with each strap comprising two or more strap elements circumferentially extending about said rotor in a common plane, and wherein a clamping mechanism releasably connects an end of one strap element to an end of another strap element to permit the respective strap and the one or more threshing elements connected thereto to be quickly and easily replaced or shifted relative to threshing elements carried by adjacent straps.

14. A threshing component adapted for attachment to a combine rotor, said threshing component comprising:
    a semi-rigid strap having inner and outer generally parallel major surfaces with first and second ends and a generally curved configuration intermediate the ends thereof, with the ends of each strap being separated by a distance approximating between a 90° to 180° peripheral and cross-sectional segment of the rotor to which the threshing component is adapted to be attached, each strap further including apertured and upturned extensions provided toward opposite ends thereof to project outwardly from the outer major surface, and with the curved configuration of each strap being complementary to a curved configuration provided about a periphery of the rotor to which the strap is to be attached; and a threshing element connected proximate to one of said upturned and apertured extensions on said strap, and with said threshing element being connected to said extension and along a lengthwise portion of the strap to add strength and rigidity to the threshing component.

15. A threshing rotor for a combine, said rotor comprising:

an elongated dram adapted for rotation about a fixed axis and having a generally cylindrical outer wall extending between longitudinally spaced ends of the drum; and a plurality of straps circumferentially arranged about said outer wall of the drum between said ends, each strap comprising a plurality of interconnected strap elements circumferentially arranged in a common plane about said dram, with each strap having at least one threshing element connected thereto, and wherein the strap elements are interconnected to each other and releasably clamped to the outer wall of the drum by a clamping mechanism that permits the respective strap and the threshing element connected thereto to be quickly and easily replaced and/or shifted relative to threshing elements carried by adjacent straps.

16. The threshing rotor according to claim 15 wherein each strap element includes an apertured upturned extension provided toward one end thereof and which comprises a portion of the clamping mechanism, with the apertured extension of one strap element being releasably connected to the apertured extension of another strap element by a releasable clamp fastener.

17. The threshing rotor according to claim 16 wherein the threshing element is connected to each strap at the interconnection of each strap element with another strap element.

18. The threshing rotor according to claim 17 wherein each threshing element comprises a pair of side walls which project outwardly away from the outer wall of the rotor drum when the strap is releasably clamped thereto, the side walls of the threshing element being joined to each other by a front wall, and wherein at least one side wall of the threshing element is joined to a strap element and extends forwardly in the direction of rotor rotation away from the upturned extension to which it is joined to add rigidity and strength to the threshing element.

19. The threshing rotor according to claim 18 wherein an upper portion of the front wall of each threshing element extends outwardly and away from the outer wall of the rotor drum for a predetermined distance which is greater than the predetermined distance the clamp fastener is spaced from the outer wall of the rotor drum whereby, during a threshing operation, the front wall of the threshing element acts to shield the clamp fastener against impacts with crop materials thereby prolonging the useful life of the clamp fastener while inhibiting damage to the crop materials during the threshing process.

* * * * *